(12) United States Patent
Stoller et al.

(10) Patent No.: US 6,781,115 B2
(45) Date of Patent: Aug. 24, 2004

(54) SUBSURFACE RADIATION PHENOMENA DETECTION WITH COMBINED AND AZIMUTHALLY SENSITIVE DETECTORS

(75) Inventors: Christian Stoller, Kingwood, TX (US); Xavier Herve, Milan (IT); Sunil N. Gulrajani, Aberdeenshire (GB); Peter Wraight, Skillman, NJ (US); Verna L. Lomax, New York, NY (US); Dennis J. Pittman, Lawrenceville, NJ (US); Jean-Pierre Poyet, Larchmont, NY (US)

(73) Assignee: Schlumberger Technology Corporation, Sugar Land, TX (US)

( * ) Notice: Subject to any disclaimer, the term of this patent is extended or adjusted under 35 U.S.C. 154(b) by 168 days.

(21) Appl. No.: 10/091,251

(22) Filed: Mar. 5, 2002

(65) Prior Publication Data

US 2002/0153481 A1 Oct. 24, 2002

Related U.S. Application Data

(60) Provisional application No. 60/280,188, filed on Mar. 30, 2001.

(51) Int. Cl.[7] .............................................. G01V 5/04
(52) U.S. Cl. ....................................................... 250/266
(58) Field of Search ........................................ 250/266

(56) References Cited

U.S. PATENT DOCUMENTS

| 3,255,353 | A |   | 6/1966  | Scherbatskoy |         |
| 3,539,806 | A |   | 11/1970 | Humphrey     |         |
| 3,566,118 | A | * | 2/1971  | Peters       | 250/390.11 |
| 4,169,979 | A |   | 10/1979 | Arnold et al. |        |
| 4,228,350 | A |   | 10/1980 | Paap et al.  |         |
| 4,267,446 | A |   | 5/1981  | Brown et al. |         |
| 4,381,451 | A | * | 4/1983  | Chen et al.  | 250/390.01 |
| 4,501,964 | A |   | 2/1985  | Arnold       |         |
| 4,691,102 | A |   | 9/1987  | Schultz et al. |       |
| 4,698,501 | A |   | 10/1987 | Paske        |         |
| 4,743,755 | A |   | 5/1988  | Williams     |         |
| 4,829,176 | A |   | 5/1989  | Paske et al. |         |
| 4,879,463 | A |   | 11/1989 | Wraight et al. |       |
| 4,883,956 | A |   | 11/1989 | Melcher et al. |       |
| 4,904,865 | A |   | 2/1990  | Meisner et al. |       |
| 4,937,446 | A |   | 6/1990  | McKeon et al. |        |
| 4,972,082 | A |   | 11/1990 | Loomis et al. |        |
| 5,012,091 | A |   | 4/1991  | Moake        |         |
| 5,021,652 | A |   | 6/1991  | Arnold       |         |
| 5,065,016 | A | * | 11/1991 | Supernaw et al. | 250/264 |
| 5,091,644 | A |   | 2/1992  | Minette      |         |
| 5,105,080 | A |   | 4/1992  | Stoller et al. |       |
| 5,191,210 | A | * | 3/1993  | Pauley et al. | 250/260 |
| 5,205,167 | A |   | 4/1993  | Gartner et al. |       |
| 5,219,518 | A |   | 6/1993  | McKeon et al. |        |
| 5,235,185 | A |   | 8/1993  | Albats et al. |        |

(List continued on next page.)

FOREIGN PATENT DOCUMENTS

EP 0 348 260 B1 2/1993
WO WO 00/57211 A1 9/2000

*Primary Examiner*—Constantine Hannaher
(74) *Attorney, Agent, or Firm*—Victor H. Segura; Brigitte L. Echols; John J. Ryberg (57) ABSTRACT

A system and method are disclosed for detecting radiation phenomena in an area surrounding a wellbore traversing an earth formation. A logging instrument is equipped with combined radiation detectors to provide multiple measurements at the same axial position along the instrument axis, without the use of rotating parts within the instrument. Shielded or segmented detectors provide azimuthally focused detector sensitivity. A controllable radiation source is optionally disposed on the instrument for subsurface irradiation. Also disclosed is the use of radioactive materials in unison with the logging instrument to determine subsurface flow and reservoir characteristics.

27 Claims, 5 Drawing Sheets

U.S. PATENT DOCUMENTS

| | | |
|---|---|---|
| 5,243,190 A | 9/1993 | Bandy et al. |
| 5,434,408 A | 7/1995 | Smith, Jr. et al. |
| 5,473,158 A | 12/1995 | Holenka et al. |
| 5,481,105 A | 1/1996 | Gold |
| 5,481,114 A * | 1/1996 | Daniel et al. .......... 250/390.11 |
| 5,539,225 A | 7/1996 | Loomis et al. |
| 5,567,944 A | 10/1996 | Rohe et al. |
| 5,608,214 A | 3/1997 | Baron et al. |
| 5,608,215 A | 3/1997 | Evans |
| 5,821,541 A | 10/1998 | Tumer |
| 5,841,135 A * | 11/1998 | Stoller et al. ............ 250/269.3 |
| 6,084,826 A | 7/2000 | Leggett, III |
| 6,207,953 B1 | 3/2001 | Wilson |
| 6,215,120 B1 | 4/2001 | Gadeken et al. |
| 6,300,624 B1 | 10/2001 | Yoo et al. |
| 6,495,837 B2 | 12/2002 | Odom et al. |
| 6,639,210 B2 | 10/2003 | Odom et al. |

\* cited by examiner

SUBSURFACE RADIATION PHENOMENA DETECTION WITH COMBINED AND AZIMUTHALLY SENSITIVE DETECTORS

CROSS RELATED INVENTIONS

This invention claims the benefit of U.S. Provisional Application No. 60/280,188, filed Mar. 30, 2001.

BACKGROUND OF THE INVENTION

1. Field of the Invention

The invention relates generally to exploration and production, and more particularly, to a method and apparatus for detecting radiation phenomena to determine selected properties of earth formations and well completions.

2. Background Art

The characteristics of geological formations are of significant interest in the exploration for and production of subsurface water and mineral deposits, such as oil and gas. To that end, a variety of techniques have been developed. One technique determines the natural radioactivity of the formation by measuring the gamma rays of naturally occurring radioactive elements like Thorium, Uranium and Potassium.

In a different technique radioactive tracers are injected into the formation. The subsequent measurement of these gamma rays gives valuable information on formation fractures and other properties.

One of the better-known techniques involves irradiating the subsurface earth formations with high-energy neutrons and monitoring the resulting induced gamma rays and the scattered neutrons.

Various types of radiation sources have been used in well logging systems. For example, neutrons or gamma rays may be generated simply through the use of radioactive isotopes (which naturally decay over time), an x-ray source may be used or neutrons may be generated in an electronic device utilizing a nuclear reaction generating neutrons on demand. U.S. Pat. Nos. 3,255,353, 4,596,926, 4,698,501, 4,705,944, 4,810,459, 4,829,176, 4,879,463, 4,904,865, and 5,012,091 describe logging instruments equipped with active radiation sources and appropriate sensors.

High-energy neutrons may be generated through the controlled collision of energized particles by using a nuclear fusion reaction. Such a system is commonly referred to as an electronic neutron generator. The generation of neutrons on demand by the use on energetic particle beams allows the construction of a neutron source which emits neutrons in bursts of well-determined lengths and time sequences. One such pulsed neutron generator is described in U.S. Pat. No. 3,461,291, assigned to the present assignee. The neutron source described in the '291 patent uses an accelerator tube in which charged particles, such as deuterium ions, are accelerated across a potential and contacted with a target element such as tritium. The reaction between the deuterium ions with the tritium target produces almost monoenergetic neutrons at an energy level of about 14 MeV. In most applications the neutrons are not emitted continuously but in short bursts of well-defined lengths and sequence of repetition. When using such a pulsed neutron generator, the formation surrounding the well logging instrument is subjected to repeated, discrete "bursts" of neutrons. U.S. Pat. Nos. 4,501,964, 4,883,956, 4,926,044, 4,937,446, 4,972,082, 5,434,408, 5,105,080, 5,235,185, 5,539,225, and 5,608,215 describe logging instruments equipped with neutron generators.

These pulsed neutron instruments also include one or more sensors or detectors that record numbers of neutrons, particularly epithermal energy and thermal energy, as well as gamma rays which are emitted as a result of the interaction of the neutrons with the subsurface formations and the fluids in the wellbore itself. The gamma rays may include inelastic gamma rays which are a consequence of high-energy collisions of the neutrons with atomic nuclei in the earth formations, as well as capture gamma rays emitted when low energy (thermal) neutrons are captured by susceptible atomic nuclei in the formations. Properties of the formations which may be determined as a result of measuring neutron and gamma ray phenomena include formation density, fractional volume of void or pore space in the formation (porosity), carbon/oxygen (C/O) ratios, formation lithology, and neutron capture cross section (Sigma), among other measurements. Properties which may be determined by spectral analysis of the gamma rays include concentration of various chemical elements, for example. Properties of fluids in the wellbore may also be determined from various neutron and gamma ray measurements.

Instruments which can make measurements of a plurality of the foregoing types are also described, for example, in U.S. Pat. No. 6,032,102, and in U.S. Pat. No. Re. 36,012, both assigned to the present assignee. Generally speaking, the instruments disclosed in these patents are arranged so that a pulsed neutron source therein emits a plurality of short duration neutron bursts, these being of a duration to enable relatively accurate measurement of density, through the analysis of inelastic gamma rays, and accurate measurement of porosity, through measurement of neutron "slowing down time" (SDT), or rate of decay of detected neutron count rate with respect to time shortly after the end of each neutron burst.

Nuclear measurements are also useable in nuclear spectroscopy techniques to obtain qualitative and quantitative information related to subsurface fluid movement. U.S. Pat. No. 5,219,518, assigned to the present assignee, describes an instrument equipped with a neutron source and sensors adapted to measure water flow through nuclear oxygen activation. Alternative techniques for subsurface fluid measurements include the use of radioactive markers or tracers to identify flow path between formations or wells. U.S. Pat. Nos. 5,049,743, 5,182,051, 5,243,190, and 5,929,437 describe the use of elements that can be made radioactive by bombardment with neutrons so their location can be determined by nuclear logging. Logging tools equipped with gamma ray detectors are particularly suited to distinguish and determine the location of trace materials.

U.S. Pat. Nos. 5,483,061 and 5,608,214 describe gamma ray spectral tools for well logging. Conventional logging instruments also provide azimuthal indication of the location of subterranean radiation sources. U.S. Pat. Nos. 4,169,979, 4,691,102, 5,021,652, 5,205,167, 5,481,105, 6,215,120 and 6,300,624 describe logging methods and apparatus for determining the azimuthal direction of subsurface gamma ray distributions.

Neutron logging measurements may be implemented in "wireline logging" and in measurement-while-drilling (MWD) or logging-while-drilling (LWD) systems. Power to activate these neutron and x-ray systems generally comes from either stored energy device or via transmission from the surface. Stored energy devices are typically batteries, but may include other devices such as fuel cells. Stored energy devices provide power continuously until they become depleted. In LWD/MWD applications, surface power is typically conveyed via drilling fluid (mud) flow down the drill pipe to a turbine in the tool. In wireline tools, an armored electrical cable is used to provide power to the source and for signal communication between the tool and the surface. The instrument detectors either transmit the data uphole or temporarily store it downhole. Typically, once gathered, the data is input to one or more formation evaluation models, which are typically software programs used to evaluate the geological formation from which the data was gathered.

It is desirable to have an instrument and method for improved detection of subsurface radiation phenomena.

SUMMARY OF THE INVENTION

The invention provides a system for detecting radiation phenomena in an area surrounding a wellbore traversing an earth formation. The system comprises an elongated support member adapted for disposal within the wellbore; radiation detectors are mounted on the support member, at least one of the detectors is adapted to detect gamma ray related phenomena; and at least one of the radiation detectors is segmented to provide focused sensitivity or adapted to provide multiple radiation phenomena measurements.

The invention provides a method for detecting radiation phenomena in an area surrounding a wellbore traversing an earth formation. The method comprises disposing a support member within the wellbore, the support member having radiation detectors mounted thereon, at least one of the detectors adapted to detect gamma ray related phenomena; at least one of the radiation detectors being segmented to provide focused sensitivity or adapted to provide multiple radiation phenomena measurements; and detecting radiation phenomena with one of the radiation detectors.

Other aspects and advantages of the invention will be apparent from the following description and the appended claims.

DETAILED DESCRIPTION

The present invention provides a system and method for detecting radiation phenomena in an area surrounding a wellbore traversing an earth formation. This invention integrates various measurements into one instrument to obtain a complete, relevant, reservoir evaluation. A combination of induced gamma-ray spectroscopy with a neutron-neutron and a neutron-gamma-ray measurement and a Sigma measurement offer new avenues in logging, interpretation, imaging, and reservoir management. The invention provides various measurements, including: formation density, carbon content, Sigma, lithology, hydrogen index, oil in place, and permeability determination (from the lithology measurement).

Figures 1, 2A:
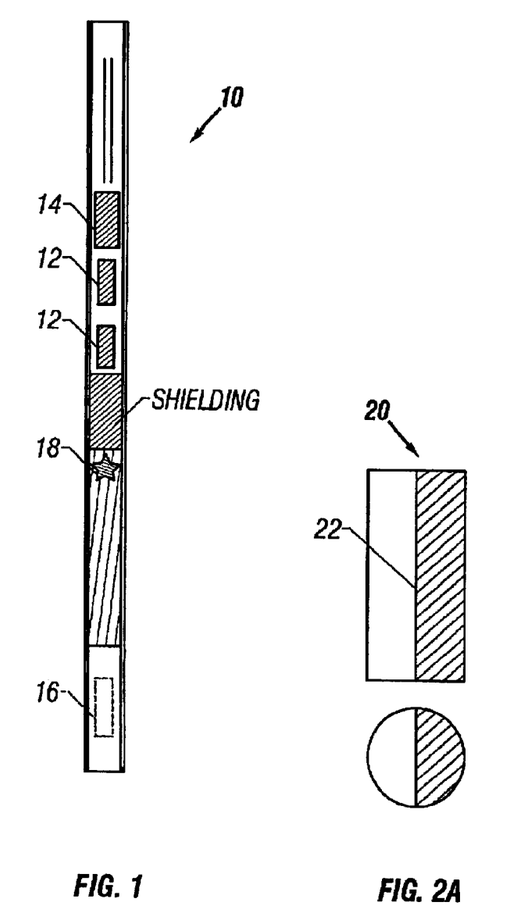
FIG. 1 is a schematic illustration of a downhole instrument in accordance with the invention.
FIGS. 2(A)–(C) are schematic diagrams illustrating side views and overhead views of segmented detectors in accordance with the invention.

FIG. 1 shows a logging instrument of the invention. The instrument 10 is equipped with two epithermal neutron detectors 12 and one gamma-ray detector 14. A fourth (optional) detector 16 is shown below a radiation source or generator 18. The detectors may comprise any suitable detector known in the art, for example a sodium iodide (NaI) crystal coupled to a photomultiplier tube, or a $^3$He counter, or a cerium-activated gadolinium orthosilicate (GSO) detector. The source 18 may be any neutron source known in the art, such as a pulsed neutron source as described in the foregoing patents.

Depending on the spacing, the gamma-ray detector 14 can be used for a neutron-gamma density measurement or, at a farther spacing, for an activation measurement. Using a neutron generator, emission from the source 18 can be pulsed in a variable pulse sequence. Neutron pulsing allows for pulse sequence optimization for the measurement of C/O and SDT as well as sequences adapted to the measurement of the total formation capture cross section.

In the inelastic type pulsing mode, the primary three detectors (12, 14) allow for various measurements, including: C/O, SDT, lithology, hydrogen index, and gas detection. In the Sigma (and late capture) type pulsing mode, the measurements include: Sigma, hydrogen index, gas detection, and activation gamma rays during burst-off background period (after complete decay of the thermal neutron capture signal).

The two pulsing modes can be completely separate or interleaved. A third pulsing mode with longer neutron off periods could be used for the measurement of activation gamma rays. More complex pulsing is possible if desired, as well as additional modes to accommodate water-flow-logging (WFL) and other measurements of the borehole fluid composition and flow.

The optional detector (16) can be either a "far" epithermal or thermal neutron detector, or a gamma-ray detector. This detector could be used for cased hole porosity (hydrogen index) measurements, gamma-ray spectroscopy (elements), and formation electron density determination. Another embodiment of the invention may be implemented with the optional detector 16 located above all the other detectors 12, 14 (not shown).

The instruments of the invention are equipped with segmented or combined detectors. FIG. 2 shows three different variants of segmented detectors 20 of the invention. One approach to segmenting a detector is to cut a large detector into two equal halves, as shown in FIG. 2(a). The two detector halves are separated by a thin opaque, reflecting light barrier 22. The light barrier 22 material prevents cross talk of the scintillation signals and reflects scintillation photons back toward the photomultiplier or another suitable photon detector and amplifier (e.g. Avalanche photodiode, PIN diode, etc.). Useable materials for the barrier 22 include white Teflon, metallic reflectors like Al and Ag, or white powders like oxides of Al, Ti and Zn. The opaque barrier 22 is provided by a sufficiently thick layer of Teflon or powder, or by any suitable opaque metallic reflector. Combinations of metallic and non-metallic reflectors are possible. The two segments do not have to be made of the same scintillation material. However, by using the same scintillation material, preferably from the same part of the crystal ingot, it is possible to use a single position sensitive multiplier structure without dual gain regulation for the readout (discussed below).

Figure 2B:
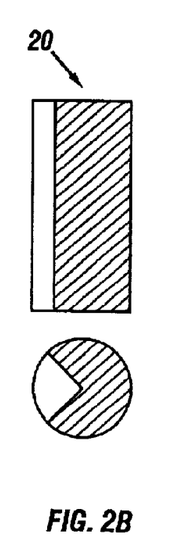
Figure 2C:
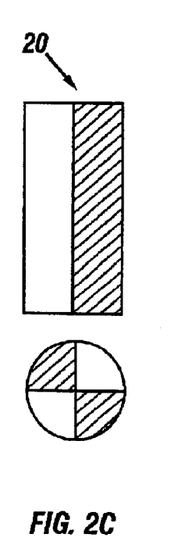

In addition to light blocking materials, the barrier 22 may also be formed with a neutron or gamma ray absorbing material to further enhance the response of the detector 20 (not shown). FIGS. 2(b) and 2(c) show other embodiments of the segmented detector 20 of the invention, wherein the detector is composed of multiple segments.

Figure 3A:
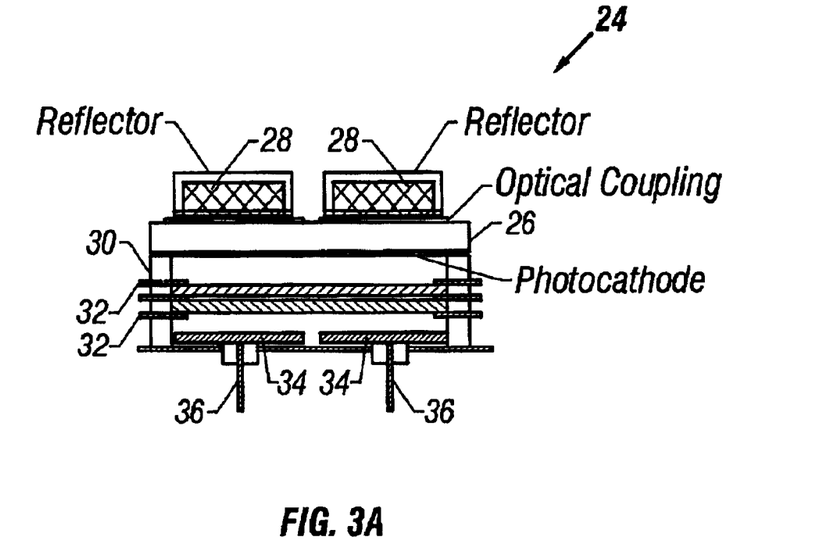
FIG. 3(A) is a schematic illustration of a detector assembly in accordance with the invention.
Figure 3B:
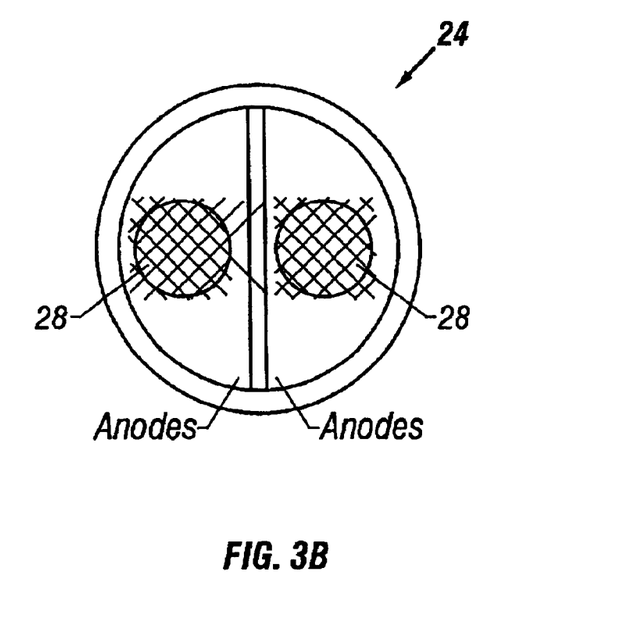
FIG. 3(B) is an overhead view of the detector assembly of FIG. 3(A).

The multi-segment detector readout can be implemented with multiple photomultipliers by using a multichannel-plate (MCP) based electron multiplier with multiple anodes, an MCP with a position sensitive readout, or a semiconductor photon detector (e.g. APD, PIN diode). FIG. 3 shows another segmented detector 20 embodiment of the invention. A simple two-detector arrangement is shown using an MCP based multiplier 24 with proximity focusing to convert the scintillation light to electrons which are multiplied in the MCP structure. This multiplier structure includes a window 26 sandwiched between the scintillators 28 and an insulator 30. Metal rings 32 are interleaved below the insulator 30 and the anodes 34 are positioned at the bottom of the structure. The same approach may be used for the detectors shown in FIG. 2.

The light from the two scintillators 28 is read separately by the two anode read outs 36. The summing and the acquisition of the left-right information can be done through analog means or by digital signal processing as known in the art. The gains (energy calibrations) of the two or more channels should be the same. The gain control can be implemented in several ways or combinations thereof, including: gain regulation for the device by adjusting the multiplier high voltage and thus the multiplier gain; gain regulation by changing the amplification in a subsequent analog amplifier; or gain regulation by digitally adjusting the effective gain. The first technique allows only the total gain to be adjusted. If no other adjustment is made, the detectors can have equal (matched) light output.

Figure 4:
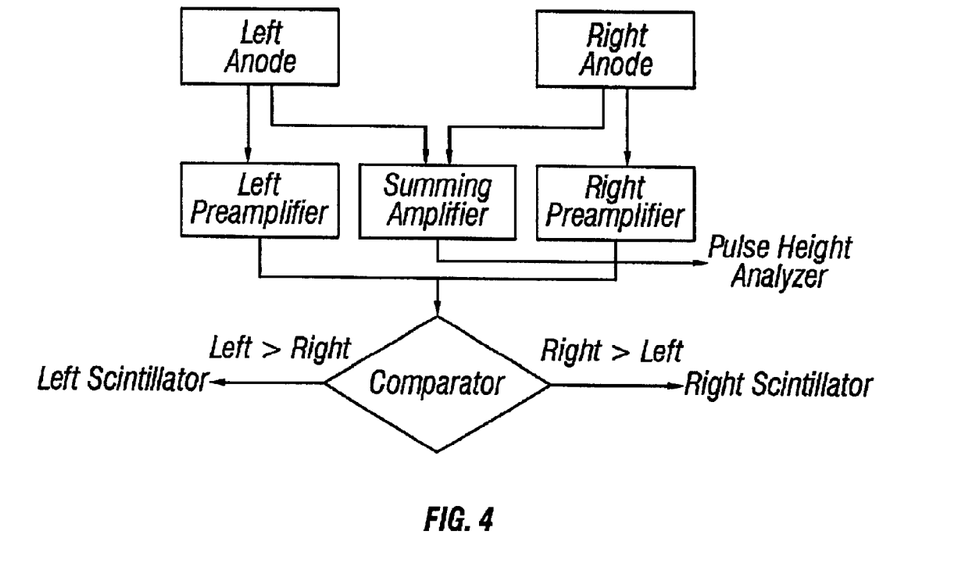
FIG. 4 is a flow diagram of a read-out process for a segmented detector in accordance with the invention.

FIG. 4 shows a flow diagram of a read-out process that may be implemented with the invention. With a two-segment detector, the left-right information is processed independently of the pulse-height information. Though the read-out process is shown for a two-segment detector, those skilled in the art will appreciate that the approach can easily be expanded to more than two detector segments.

Figure 5A:
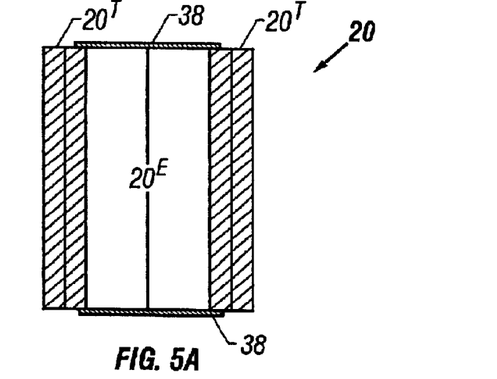
FIGS. 5(A)–(B) are schematic diagrams respectively illustrating a side view and an overhead view of a combined detector in accordance with the invention.
Figure 5B:
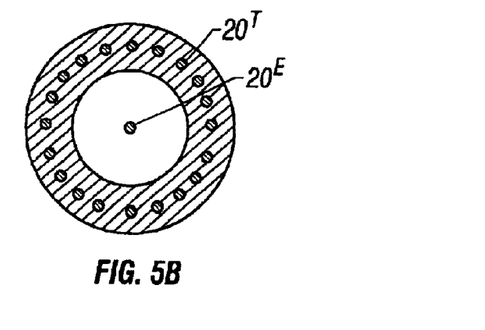

Turning to FIG. 5, a combined thermal and epithermal detector 20 embodiment of the invention is shown. Using wire-chamber technologies it is possible to create detectors which can detect thermal and epithermal counts at the same axial distance from the source. An implementation of the detectors may use the well known $^3$He detection principle. For thermal and epithermal neutron detection, the outer layer should be thick enough to provide total absorption of thermal neutrons. The thickness is dominated by the gas pressure used. The higher the pressure the smaller the distance desired for greater absorption of thermal neutrons. A multi-wire thermal counter $20^T$ surrounds a single epithermal detector $20^E$, serving as a detector and a thermal neutron shield or absorber at the same time. The thermal detector $20^T$ serves as the shielding against thermal neutrons for the epithermal detector $20^E$, provided that the outer region absorbs thermal neutrons. This allows for a position sensitive readout from the thermal counter $20^T$ Cadmium (Cd) shields 38 are placed at the top and bottom of the detector system to provide thermal suppression. In some applications the thermal detector 20 may not completely surround the epithermal detector $20^E$ (not shown).

If additional thermal suppression is needed, the epithermal detector $20^E$ can be surrounded by a Cd (or other material with a large neutron absorption cross section, e.g., Gd, $^{10}$B, etc.) shield (not shown). In one embodiment, the gamma-ray detector can be surrounded by Cd-shielding (not shown). The resulting Cd-signal could be used to measure the thermal neutron flux. The Cd shields 38 can also be omitted if other means of thermal neutron shielding is provided.

The detector 20 may also be a combination thermal and gamma-ray detector, similar to that of FIG. 5, with the central detector(s) $20^E$ consisting of a gamma-ray detector (not shown). This would allow the simultaneous measurement of the thermal flux and the gamma-ray spectra at the same axial distance from the neutron source. The thermal detector $20^T$ could be replaced by an epithermal detector (not shown). However, shielding with Cd in the vicinity of a gamma-ray detector may lead to unwanted background from the capture gamma rays in Cd.

Figure 6A:
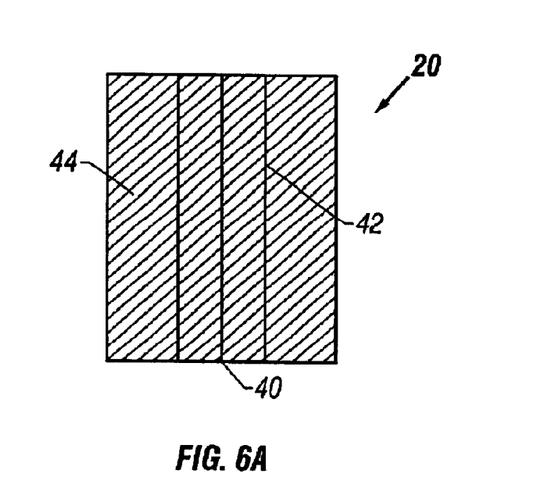
FIGS. 6(A)–(B) are schematic diagrams respectively illustrating a side view and an overhead view of a combined detector in accordance with the invention.
Figure 6B:
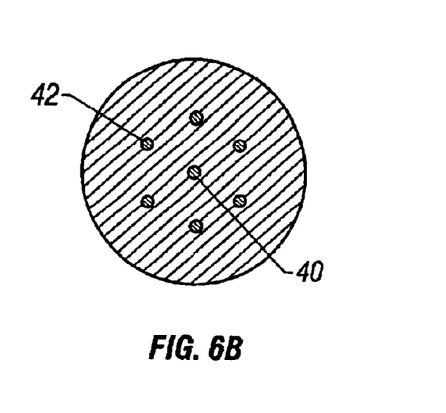

FIG. 6 shows another detector embodiment of the invention. A position sensitive segmented $^3$He neutron detector 20 is shown. The detector includes a central wire 40 surrounded by multiple auxiliary 42 wires. The detector is comparable to traditional $^3$He detectors and incorporates wire chambers. The central wire 40 and the housing 44 are at negative and the auxiliary wires 42 at positive potential. The signal can be read from the positive wires 42. Reading an additional signal from the central wire 40 allows for neutron energy discrimination, if thermal neutrons are preferentially stopped in the region between the housing wall and the auxiliary wires 42. Detector 20 sensitivity is also affected by internal gas pressure and detector diameter. This detector approach is most efficient when the neutrons are stopped in a distance that is substantially smaller than the detector size. This detector 20 design provides added information from neutrons, which would normally be stopped in a conventional detector. The use of a single detector with multiple read-outs is ideal for most exploration and production environments.

Figure 7:
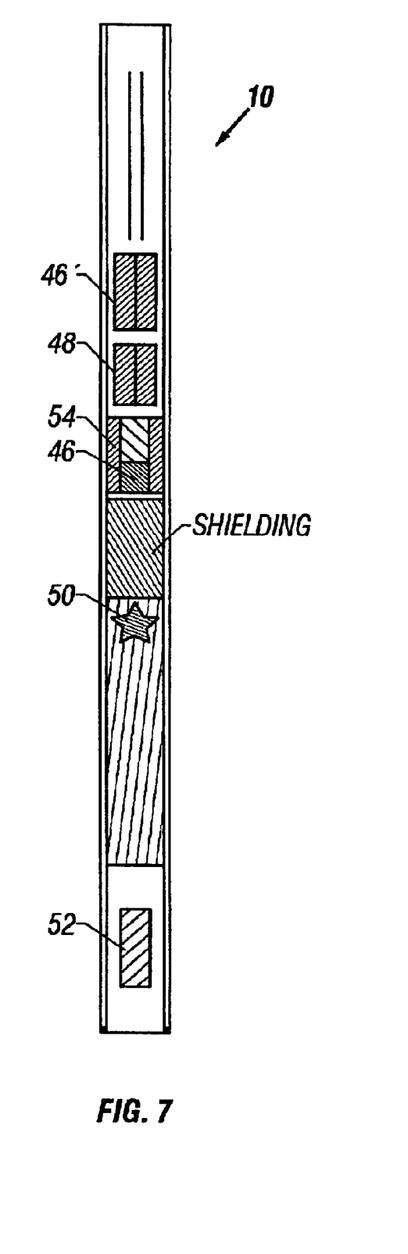
FIG. 7 is a schematic illustration of a downhole instrument in accordance with the invention.

FIG. 7 shows another embodiment of the invention. The instrument 10 includes two gamma-ray detectors 46, 46', a single neutron detector 48, a radiation source 50, and a fourth (optional) detector 52. This instrument configuration will provide measurements similar to those obtained with the configuration of FIG. 1. This instrument 10 also incorporates the segmented and/or combined detectors described above.

A segmented far gamma-ray detector 46' is located near the dual thermal-epithermal neutron detector 48, located near the gamma-ray detector 46, which is surrounded by an epithermal neutron counter 54. The optional detector 52 may be an epithermal neutron detector, a gamma-ray detector, or a combined neutron-gamma-ray detector (gamma detector surrounded by epithermal neutron detector). A combined detector provides for a simultaneous gamma-ray density and epithermal neutron measurement. A neutron monitor 56 may also be mounted on the instrument 10 to obtain absolute gamma ray and neutron counting yields. Shielding is also used around the radiation generator 50 to impede undesired background from gamma rays and neutrons.

Among the various measurements and subsurface properties that may be derived with the segmented or combined detectors of the invention is an optimized C/O measurement. The detectors of the invention provide an active method to improve the distinction between the formation and the borehole signal, allowing for borehole fluid compensation of the C/O answer, or alternatively, for compensation of a borehole measurement to eliminate the influence of the formation signal.

It will be appreciated by those skilled in the art that other detector arrangements (focused detectors) may be implemented with the invention. For example, the instrument diameter may be varied to permit other detector configurations, including multi-layered detectors to provide various measurement combinations (not shown).

Figure 8:
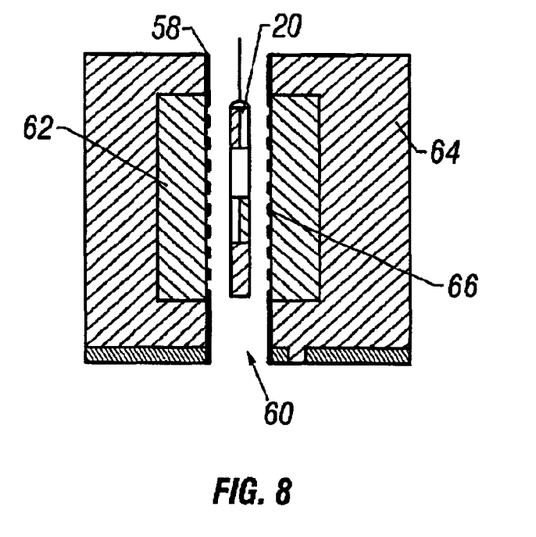
FIG. 8 is a schematic illustration of a downhole instrument disposed within a gravel-packed formation in accordance with the invention.

FIG. 8 shows another embodiment of the invention incorporating an azimuthal gamma-ray measurement using the disclosed instruments and detectors. This embodiment incorporates the use of radioactive markers or tracers (not shown), using their unique identification codings (Gamma Ray activity depending on the material used) to identify subsurface flow path.

As shown in FIG. 8, well completions generally comprise a tubular 58, typically casing or a liner, disposed within the wellbore 60. Gravel packing 62 is also used to buttress the surrounding formation 64, preventing erosion during production. Perforations 66 in the tubular 58 permit fluid passage between the wellbore and formation. Packers, flow control devices, and other devices may also be installed in various positions in the well to manage the production from respective zones (not shown). In this manner, one or more zones in one or more formations may be perforated to enable production of water or hydrocarbons.

The instrument 10 includes one or more gamma ray detectors 20 to provide a scanning or azimuthal radiation measurement. The detectors 20 are segmented as described herein such that the detectors provide a focused measurement. Each detector's 20 sensitivity may be adjusted to any desired region. One embodiment may provide a 90-degree sector of sensitivity around the instrument circumference (not shown). In addition to the segmenting techniques disclosed herein, shielding can also be used to focus the sensitivity of each detector 20 about the instrument 10 azimuth.

Each detector 20 may be partially shielded (represented by the shaded detector regions in FIG. 8) with a suitable material to define and focus its sensitivity as desired. Any suitable shielding material may be used as known in the art. One embodiment may be constructed using a tungsten alloy collimator to shield the detectors (not shown). In this manner, combined outputs and active shielding are used to provide a continuous azimuthal gamma-ray log.

This invention is operable without the use of a radiation source on the instrument 10, such as when radioactive tracers or marker materials are used or where natural gamma ray emissions exist. Solid or liquid radioactive tracers may be introduced into a fluid such that when the contaminated fluid is disposed within the borehole or the formation, the gamma-ray detector 20 on the instrument 10 obtains azimuthal measurements of the fluid displacement. Any suitable tracer or marker material may be used as known in the art, for example Scandium-46. A high-energy tracer may be used for deep propagation applications where directional data is needed. Low-energy tracers may be used for near wellbore applications, permitting maximum azimuthal sensitivity. Useable marker materials also include radioactive materials placed as part of the well completion. For example, conventional radioactive pip-tags, which emit distinct radioactive "signatures", may be used with the invention to facilitate a determination of subsurface profiles.

Alternatively, the instrument 10 may include a radiation source (as described above) to bombard and excite selected elements as known in the art. For example, excitable gravel particles or other known specialized materials may be placed in the wellbore and irradiated with the source to identify subsequent gamma ray activity. It will also be appreciated that these measurement techniques may be applied in any type of borehole, including deviated or horizontal boreholes. However, for certain measurements the instrument 10 is preferably run centralized within the wellbore.

The combination of radioactive tracers and the directional gamma ray measurement techniques of the invention provide the ability to determine the azimuthal orientation of directional features within the reservoir. Applications of the invention include formation injectivity profiling (stimulation, treatment), gravel pack quality checks, through-tubing subsidence measurement, cement quality indication (in cased hole applications), scale treatment evaluation, through-tubing dipmeter, completion orientation, natural fissure imaging, hydraulic fracture determination, cuttings re-injection, etc. It therefore can also be used to quantify the effectiveness of intervention treatments, and consequently as a tool for reservoir management and productivity enhancement.

Figure 9:
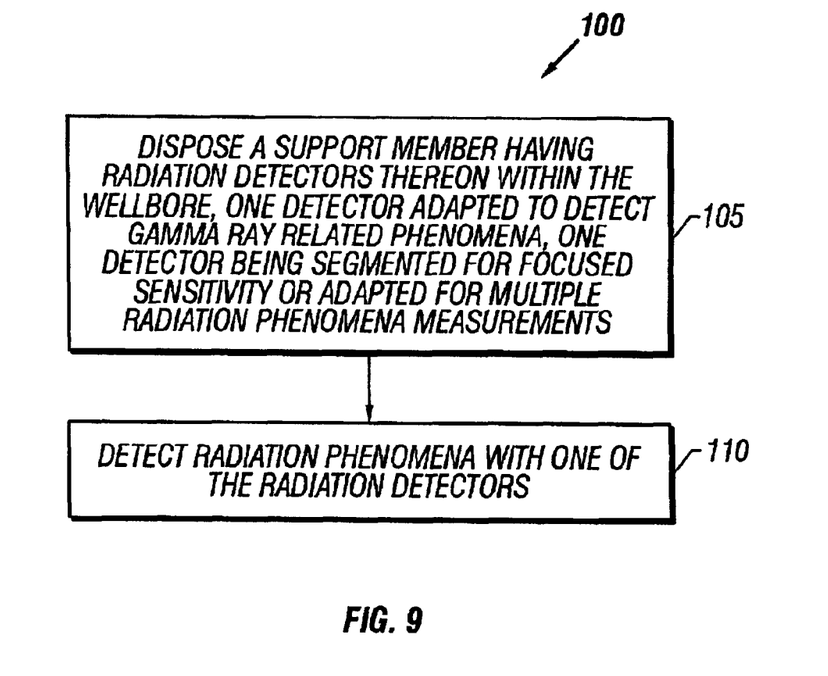
FIG. 9 is a flow diagram of a method for detecting radiation phenomena in an area surrounding a wellbore in accordance with the invention.

FIG. 9 shows a flow diagram of a method 100 method for detecting subsurface radiation phenomena in an area surrounding a wellbore in accord with the invention. At 105, a support member is disposed within the wellbore, the support member having radiation detectors mounted thereon, at least one of the detectors adapted to detect gamma ray related phenomena; at least one of the radiation detectors being segmented to provide focused sensitivity or adapted to provide multiple radiation phenomena measurements. At 110, radiation phenomena are detected with one of the radiation detectors.

It will be appreciated by those skilled in the art that the instruments 10 of the invention may be powered and activated using the energy transmission devices known in the art and described in the foregoing patents. Instrument-to-surface communication, and vice-versa, may be implemented using conventional telemetry techniques as known in the art as well. The instruments 10 are generally equipped with conventional electronics and hardware (not shown) to provide relative bearing (orientation with respect to deviation). The combination of results provided by the invention may also be stored and processed using direct or forward modeling techniques known in the art to obtain relevant reservoir parameters. The precise forms of the data storage devices and of the processing instructions are immaterial here. In addition to wireline cables and drill collars, the instruments of the invention may also be conveyed within the wellbore using coiled tubing or slicklines.

While the invention has been described with respect to a limited number of embodiments, those skilled in the art, having benefit of this disclosure, will appreciate that other embodiments can be devised which do not depart from the scope of the invention as disclosed herein. For example, other sensors may be combined with the disclosed measurement techniques to provide additional measurements such as pressure, temperature, etc. Accordingly, the scope of the invention should be limited only by the attached claims.

What is claimed is:

1. A system for detecting radiation phenomena in an area surrounding a wellbore traversing an earth formation, comprising:
   an elongated support member adapted for disposal within said wellbore;
   a radiation detector mounted on said support member;
   said radiation detector having a wire centrally disposed therein and extending along a longitudinal axis of the detector to detect radiation; and
   said radiation detector having multiple wires disposed therein surrounding the central wire and extending along the detector longitudinal axis to detect radiation;
   wherein said centrally disposed and surrounding wires are adapted to simultaneously provide different types of radiation phenomena measurements.

2. The system of claim 1, further comprising a radiation source mounted on said support member.

3. The system of claim 2, wherein the radiation source comprises a controllable neutron source adapted to emit selected duration bursts of high-energy neutrons.

4. The system of claim 2, wherein the radiation source comprises an x-ray source.

5. The system of claim 1, wherein the radiation detector is adapted to detect neutron related phenomena.

6. The system of claim 5 wherein the detector is adapted to detect thermal or epithermal neutrons.

7. The system of claim 1, wherein said support member is adapted for disposal within said wellbore during or alter drilling of said wellbore.

8. The system of claim 1, further comprising a marker material adapted for disposal within the wellbore or the formation said material being naturally radioactive or capable of being made radioactive when bombarded with neutrons.

9. The system of claim 1, wherein the detector is adapted to provide azimuthal sensitivity about said support member.

10. The system of claim 9 wherein the detector comprises a plurality of scintillation material segments joined together.

11. The system of claim 9, wherein the detector comprises a plurality of scintillation material segments coupled to a multiplier adapted to convert light to electron signals.

12. The system of claim 1, wherein the detector is adapted to detect gamma rays.

13. A method for detecting radiation phenomena in an area surrounding a wellbore traversing an earth formation, comprising:
   disposing a support member within said wellbore, said support member having a radiation detector mounted thereon, said radiation detector having a wire centrally disposed therein and extending alone a longitudinal axis of the detector to detect radiation, and multiple wires disposed therein surrounding the central wire and extending along the longitudinal axis to detect radiation, wherein said centrally disposed and surrounding wires are adapted to simultaneously provide different types of radiation phenomena measurements; and
   detecting radiation phenomena with said radiation detector.

14. The method of claim 13, wherein the detector is adapted to detect neutron related phenomena.

15. The method of claim 13, wherein said radiation detecting step comprises detecting gamma ray related phenomena.

16. The method of claim 13, wherein said support member comprises a radiation source disposed thereon.

17. The method of claim 16, wherein said radiation source comprises a neutron source.

18. The method of claim 17, further comprising irradiating the formation or wellbore with neutrons from on source.

19. The method of claim 17, wherein said neutron source is adapted to emit selected duration bursts of high-energy neutrons.

20. The method of claim 13, wherein said support member is disposed within said wellbore during drilling of said wellbore.

21. The method of claim 13, wherein said support member is disposed within said wellbore after drilling of said wellbore.

22. The method of claim 13, further comprising disposing a marker material within the wellbore or formation, said material being naturally radioactive or capable of being made radioactive when bombarded with neutrons.

23. The method of claim 13, wherein the detector is adapted to provide azimuthal sensitivity about said support member.

24. The method of claim 23, wherein the detector comprises a plurality of scintillation material segments joined together.

25. The method of claim 23, wherein the detector comprises a plurality of scintillation material segments coupled to a multiplier adapted to convert light to electron signals.

26. The method of claim 13, wherein the detector is adapted to detect thermal or epithermal neutrons.

27. The method of claim 13, wherein the detector is adapted to detect gamma rays.

* * * * *